US012676496B2

(12) United States Patent
Li

(10) Patent No.: US 12,676,496 B2
(45) Date of Patent: Jul. 7, 2026

(54) CHARGING APPARATUS, CHARGING METHOD, AND COMPUTER-READABLE STORAGE MEDIUM

(71) Applicant: Huawei Digital Power Technologies Co., Ltd., Shenzhen (CN)

(72) Inventor: Ruisheng Li, Hangzhou (CN)

(73) Assignee: Huawei Digital Power Technologies Co., Ltd., Shenzen (CN)

( * ) Notice: Subject to any disclaimer, the term of this patent is extended or adjusted under 35 U.S.C. 154(b) by 798 days.

(21) Appl. No.: 18/070,878

(22) Filed: Nov. 29, 2022

(65) Prior Publication Data

US 2023/0170720 A1 Jun. 1, 2023

(30) Foreign Application Priority Data

Nov. 30, 2021 (CN) .......................... 202111443924.5

(51) Int. Cl.
*H02J 7/94* (2026.01)
*H01M 10/42* (2006.01)
(Continued)

(52) U.S. Cl.
CPC ............. *H02J 7/947* (2026.01); *H01M 10/44* (2013.01); *H01M 10/443* (2013.01);
(Continued)

(58) Field of Classification Search
CPC .. H02J 7/00716; H02J 7/00041; H02J 7/0048; H02J 7/00714; H02J 7/007194;
(Continued)

(56) References Cited

U.S. PATENT DOCUMENTS

| | | | |
|---|---|---|---|
| 2013/0181659 | A1 | 7/2013 | Chang et al. |
| 2017/0271887 | A1 | 9/2017 | Heo |
| 2019/0237974 | A1 | 8/2019 | Dang et al. |

FOREIGN PATENT DOCUMENTS

| | | |
|---|---|---|
| CN | 105990878 A | 10/2016 |
| CN | 107171380 A | 9/2017 |

(Continued)

OTHER PUBLICATIONS

Lee Yong-Ouk et al., "Rapid Charging Strategy in the Constant Voltage Mode for a High Power Li-Ion Battery," 2013 IEEE Energy Conversion Congress Ano Exposition, IEEE, Sep. 15, 2013 (Sep. 15, 2013), pp. 4725-4731, XP032516319.

(Continued)

*Primary Examiner* — Julian D Huffman
*Assistant Examiner* — Nathan J Instone
(74) *Attorney, Agent, or Firm* — Slater Matsil, LLP

(57) ABSTRACT

A charging apparatus and charging method. The apparatus includes a step-current adjustment circuit and an inertial link circuit. The step-current adjustment circuit is configured to determine a first current value based on a charging current condition, and provide a current of the first current value to the inertial link circuit, where the charging current condition includes a temperature and a charge state of the battery, and determine a second current value based on a present charging current condition and in response to the charging current condition changing, and provide a current of the second current value to a current smoothing module. The inertial link circuit adjusts the charging current from the first current value to the second current value in response to the received charging current being converted from the first current value to the second current value, and continuously outputs the adjusted current to the battery.

15 Claims, 4 Drawing Sheets

(51) Int. Cl.
    *H01M 10/44*        (2006.01)
    *H02J 7/40*         (2026.01)
    *H02J 7/82*         (2026.01)
    *H02J 7/90*         (2026.01)

(52) U.S. Cl.
    CPC ................ *H02J 7/445* (2026.01); *H02J 7/82*
    (2026.01); *H02J 7/94* (2026.01); *H02J 7/977*
    (2026.01); *H01M 2010/4271* (2013.01); *H02J*
    *2207/20* (2020.01)

(58) Field of Classification Search
    CPC .. H02J 2207/20; H01M 10/44; H01M 10/443;
    H01M 2010/4271
    USPC ........................................................ 320/107
    See application file for complete search history.

(56) References Cited

FOREIGN PATENT DOCUMENTS

| CN | 109728371 A | 5/2019 | |
| CN | 110011374 A * | 7/2019 | ........... H02J 7/0085 |
| EP | 2833502 B1 | 7/2016 | |

OTHER PUBLICATIONS

Jiang Jiuchun et al., "Evaluation of Acceptable Charging Current of Power Li-Ion Batteries Based on Polarization Characteristics," IEEE Transactions on Inoustrial Electronics, IEEE Service Center, Piscataway, NJ, USA, vol. 61 , No. 12, Dec. 1, 2014 (Dec. 1, 2014), pp. 6844-6851, XP011558857.

* cited by examiner

Target resistor 21 ——— Target inductor 22

Lag-time adjustment circuit 20

CHARGING APPARATUS, CHARGING METHOD, AND COMPUTER-READABLE STORAGE MEDIUM

CROSS-REFERENCE TO RELATED APPLICATION

This application claims priority to Chinese Patent Application No.202111443924.5, filed on Nov. 30, 2021, which is hereby incorporated by reference in its entirety.

TECHNICAL FIELD

This application relates to the field of battery charging, and in particular, to a charging apparatus, a charging method, and a computer-readable storage medium.

BACKGROUND

Nowadays, energy problems are more prominent in the world. As a kind of clean energy, a battery is used more widely in many scenarios, and frequency of use of the battery is also increasing. Frequent use of the battery inevitably leads to a need for frequently charging the battery. To improve charging efficiency, a fast charging technology is rapidly popularized. When the battery is charged by using the fast charging technology, a larger charging current can be implemented. However, a high current results in relatively severe heat emission of the battery, or results in frequent changes of a state of charge (SOC) of the battery, Therefore, current parameters that are used for fast charging and that are provided by a manufacturer of the battery tend to present a step change.

Because the step change in a current usually occurs in a very short time, a phenomenon of charging power jump may occur, and due to a polarization phenomenon of the battery, a voltage jump of the battery may also occur during the step change in the current. Polarization means that, when a current flows through the battery, a phenomenon in which a potential is enabled to deviate from an equilibrium potential exists. In particular, for a battery with a strong charging and discharging capability, a difference value of a step change of a fast charging current may be larger. Therefore, a power jump generated instantaneously may also be extremely large, The power jump causes a loss to a component in a charging circuit, and affects reliability of the charging circuit. In addition, a voltage jump or a voltage overshoot that is caused by this may also enable the battery to frequently trigger a fault protection mechanism. It can be learned that, on the premise of implementing fast charging, the current needs to be further optimized in a step charging process, so as to reduce or even eliminate frequent protection triggering that is caused by a power jump or a voltage overshoot and reduce a loss to a component.

SUMMARY

This application provides a charging apparatus, a charging method, and a computer-readable storage medium, to eliminate frequent protection triggering caused by a power jump or a voltage overshoot in a step charging process, and reduce a loss to a component.

According to a first aspect, this application provides a charging apparatus. The apparatus includes a step-current adjustment circuit and an inertial link circuit. An input end of the step-current adjustment circuit is connected to a direct current input source, an output end of the step-current adjustment circuit is connected to an input end of the inertial link circuit, and an output end of the inertial link circuit is connected to a battery. The step-current adjustment circuit is configured to: adjust a current that is input by the direct current input source to a current of a first current value based on a present charging current condition, and input the current of the first current value to the inertial link circuit, where the charging current condition includes a temperature of the battery and a state of charge SOC of the battery; and when the charging current condition changes, adjust the current that is input by the direct current input source to a current of a second current value based on a present charging current condition, and input the current of the second current value to the inertial link circuit. The inertial link circuit is configured to: when a received charging current is the first current value, output the current of the first current value to the battery; when the received charging current is converted from the first current value to the second current value, smoothly adjust the charging current from the first current value to the second current value, and continuously output the smoothly adjusted current to the battery in a smooth adjustment process; and after the charging current is smoothly adjusted from the first current value to the second current value, output the current of the second current value to the battery.

In this embodiment of this application, the inertial link circuit m the charging apparatus may be used to resolve a disadvantage during step charging and eliminate problems of the power jump and the voltage overshoot, so that problems of the loss to the component and frequent false triggering of a fault protection policy that are caused by the power jump and the voltage overshoot can be avoided. In addition, a current smooth transition rate of the step charging may also be changed based on an actual need.

In a possible implementation, in a process in which the inertial link circuit smoothly adjusts the charging current from the first current value to the second current value, an output. current value that is output by the inertial link circuit to the battery gradually changes from the first current value to the second current value. In the process in which the first current value is smoothly adjusted to the second current value, the current gradually changes from the first current value to the second current value. Therefore, the loss to the component that is caused by the power jump and the voltage overshoot may be avoided.

In a possible implementation, in a process in which the inertial link circuit smoothly adjusts the charging current from the first current value to the second current value, if the first current value is less than the second current value, an output current value of the inertial link circuit gradually increases from the first current value to the second current value.

In a possible implementation, in a process in which the inertial link circuit smoothly adjusts the charging current from the first current value to the second current value, if the first current value is not less than the second current value, an output current value of the inertial link circuit gradually decreases from the first current value to the second current value.

In a possible implementation, a change of an output current value that is output by the inertial link circuit to the battery is related to the first current value, the second current value, and a set time constant. A magnitude of the set time constant may be changed based on an actual need. Therefore, the current smooth transition rate of the step charging may be changed based on an actual need. In addition, when step charging is performed on the battery, a charging end polarization phenomenon of the battery also changes based on a time constant function. Therefore, reverse compensation may be performed by using the inertial link circuit in this application, to implement a depolarization change of the battery, so as to extend a battery life.

In a possible implementation, the inertial link circuit is specifically configured to gradually change, based on a transfer function, the output current value that is output to the battery from the first current value to the second current value. When the first current value is less than the second current value, the transfer function is:

$$y(t) = k_1 + (k_2 - k_1) * e^{-\frac{t}{\tau}}.$$

When the first current value is not less than the second current value, the transfer function is:

$$y(t) = k_1 - (k_1 - k_2) * \left(1 - e^{-\frac{t}{\tau}}\right),$$

where y(t) is the output current value that is output by the inertial link circuit to the battery, $k_1$ is the first current value, $k_2$ is the second current value, $\tau$ is the set time constant, and t is a time elapsed after the charging current that is received by the inertial link circuit is converted from the first current value to the second current value.

In a possible implementation, the inertial link circuit includes a target resistor and a target inductor, and the target resistor is connected to the target inductor in series. The target resistor and the target inductor constitute a resistor-inductor RL circuit. Correspondingly in the RL circuit, a larger inductance value indicates more energy that is stored in the inductor, and indicates a longer charging and discharging time; and a smaller resistance indicates smaller power that is consumed by the resistor, and similarly indicates a longer charging and discharging time.

In a possible implementation, the inertial link circuit is specifically configured to determine a resistance value of the target resistor and an inductance value of the target inductor based on the set time constant. Specifically, the target resistor and the target inductor constitute the resistor-inductor RL circuit, and the set time constant is equal to a ratio of the target resistor to the target inductor. Therefore, the resistance value of the target resistor and the inductance value of the target inductor may be determined based on the predetermined set time constant.

In a possible implementation, the inertial link circuit is specifically configured to: when the resistance value of the target resistor is fixed, determine the inductance value of the target inductor based on a product of the set time constant and the resistance value of the target resistor; or when the inductance value of the target inductor is fixed, determine the resistance value of the target resistor based on a ratio of the inductance value of the target inductor to the set time constant.

In a possible implementation, the charging apparatus further includes a temperature and state of charge monitoring module. The temperature and state of charge monitoring module is configured to: detect a temperature of the battery and a state of charge of the battery, and determine a present charging current condition. The temperature and state of charge monitoring module may include a voltage detection circuit, a current detection circuit, and a temperature detection circuit. The voltage detection circuit may be connected to the battery, and is configured to detect a voltage of the battery. The current detection circuit may be connected to the battery, and is configured to detect a current of the battery. The temperature and state of charge monitoring module determines an SOC of the battery based on a voltage and a current of the battery that are collected in real time by the voltage detection circuit and the current detection circuit, or based on a voltage and a current of the battery that are collected at a fixed time point or at an interval. The temperature detection circuit is configured to collect the temperature of the battery in real time, or collect, at a fixed time point or at an interval, the voltage and the current of the battery in real time.

Usually, different temperatures of the battery or different SOCs of the battery lead to different performance of the battery. Therefore, when the temperatures of the battery or the SOCs of the battery are different, charging efficiency of the battery is different. In a possible implementation, the charging apparatus further includes a step-current relationship establishment module. The module is configured to establish at least one correspondence between a charging current condition and a current value, where a current value in any correspondence between a charging current condition and a current value is a charging current value in a constant current charging stage. The step-current adjustment circuit is specifically configured to: determine, based on the at least one correspondence between a charging current condition and a current value, a first current value corresponding to a present charging current condition, and adjust a current that is input by the direct current input source to a current of the first current value and when the charging current condition changes, determine, based on the at least one correspondence between a charging current condition and a current value, a second current value corresponding to a present charging current condition, and adjust the current that is input by the direct current input source to a current of the second current value. The correspondence between a charging current condition and a current value may include at least one temperature, an SOC, and a charging parameter set corresponding to the temperature and the SOC. A step-current determining module may search the correspondence between a charging current condition and a current value for a charging current corresponding to a collected temperature.

According to a second aspect, an embodiment of this application provides a charging method, where the method is applied to a scenario of constant current charging. The method includes: adjusting a current that is input by a direct current input source to a current of a first current value based on a present charging current condition, where the charging current condition includes a temperature of a battery and a state of charge SOC of the battery; when the charging current condition changes, adjusting the current that is input by the direct current input source to a current of a second current value based on a present charging current condition; when a charging current is the first current value, outputting the current of the first current value; when the charging current is converted from the first current value to the second current value, smoothly adjusting the charging current from the first current value to the second current value, and continuously outputting the smoothly adjusted current in a smooth adjustment process; and after the charging current is smoothly adjusted from the first current value to the second current value, outputting the current of the second current value.

In a possible implementation, in a process in which the charging current is smoothly adjusted from the first current value to the second current value, an output current value that is output to the battery gradually changes from the first current value to the second current value.

In a possible implementation, a change of the output current value that is output to the battery is related to the first current value, the second current value, and a set time constant.

In a possible implementation, the smoothly adjusting the charging current from the first current value to the second current value includes:

gradually changing, based on a transfer function, the output current value that is output to the battery from the first current value to the second current value. When the first current value is less than the second current value, the transfer function is:

$$y(t) = k_1 + (k_2 - k_1) * e^{-\frac{t}{\tau}}.$$

When the first current value is not less than the second current value, the transfer function is:

$$y(t) = k_1 - (k_1 - k_2) * \left(1 - e^{-\frac{t}{\tau}}\right),$$

where y(t) is the output current value that is output to the battery, $k_1$ is the first current value, $k_2$ is the second current value, $\tau$ is the set time constant, and t is a time elapsed after the charging current that is received by an inertial link circuit is converted from the first current value to the second current value.

In a possible implementation, the method further includes: establishing at least one correspondence between a charging current condition and a current value, where a current value in any correspondence between a charging current condition and a current value is a charging current value in a constant current charging stage.

The adjusting a current that is input by a direct current input source to a current of a first current value, and when the charging current condition changes, adjusting the current that is input by the direct current input source to a current of a second current value based on a present charging current condition includes: determining, based on the at least one correspondence between a charging current condition and a current value, a first current value corresponding to the present charging current condition, and adjusting the current that is input by the direct current input source to the current of the first current value; and when the charging current condition changes, determining, based on the at least one correspondence between a charging current condition and a current value, a second current value corresponding to a present charging current condition, and adjusting the current that is input by the direct current input source to the current of the second current value.

In a possible implementation, the method further includes:

detecting a temperature of the battery and a state of charge of the battery, and determining the present charging current condition.

According to a third aspect, this application provides a computer-readable storage medium, storing computer instructions. When the computer instructions are executed by a charging apparatus, the charging apparatus is enabled to perform the charging method provided in the second aspect.

According to a fourth aspect, this application provides a charging station. The charging station includes the charging apparatus provided in the first aspect. The charging station is configured to supply electric energy to a device to be charged.

According to a fifth aspect, this application provides a charging system. The charging system includes a direct current input source, a device to be charged, and the charging station in the fourth aspect. An input end of the charging apparatus is connected to the direct current input source, an output end of the charging apparatus is connected to the device to be charged, and the charging apparatus is configured to supply electric energy of the direct current input source to a battery in the device to be charged.

These aspects or other aspects of this application are clearer and more comprehensible in descriptions of the following embodiments.

DESCRIPTION OF EMBODIMENTS

Figure 1:
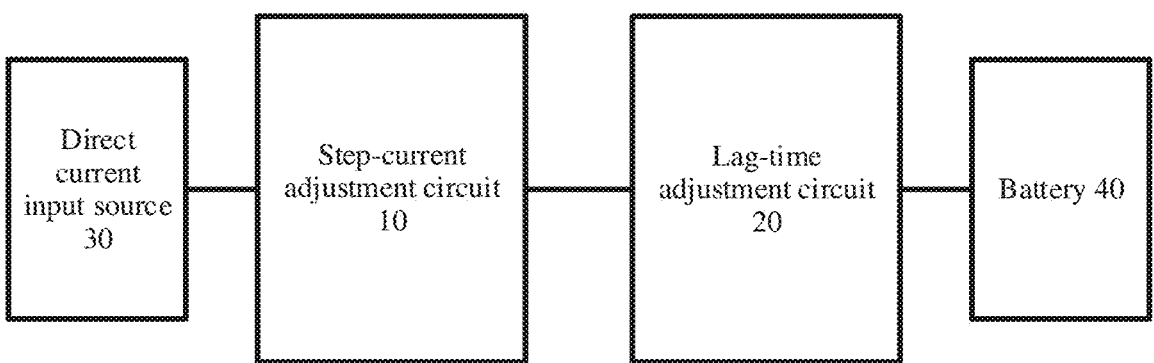
FIG. 1 is a schematic diagram of a structure of a charging apparatus.

To make objectives, technical solutions, and advantages of this application clearer, the following further describes this application in detail with reference to the accompanying drawings. However, example implementations can be implemented in a plurality of forms, which should not be construed as being limited to the implementations described herein. In contrast, these implementations are provided to make this application more comprehensive and complete, and concepts of the example implementations are comprehensively communicated to a person skilled in the art. The same reference numerals in the accompanying drawings represent the same or similar structures, and repeated descriptions will be omitted. Words for expressing positions and directions in this application described by using the accompanying drawings as examples. However, changes may be made as required, and all changes shall fall within the protection scope of this application. The accompanying drawings in this application are merely used to show a relative positional relationship, and do not represent a true scale.

To make objectives, technical solutions, and advantages of this application clearer, the following further describes this application in detail with reference to the accompanying drawings. A specific operation method in a method embodiment may also be applied to an apparatus embodiment or a system embodiment. It should be noted that, in the description of this application, "at least one" refers to one or more, and "a plurality of" refers to two or more. In view of this, in embodiments of this application, "a plurality of" may also be understood as "at least two". The term "and/or" describes an association relationship for associated objects and represents that three relationships may exist. For example, A and/or B may represent the following three cases: Only A exists, both A and B exist, and only B exists. In addition, the character "/" generally indicates an "or" relationship between the associated objects unless otherwise specified. In addition, it should be understood that in description of this application, terms such as "first" and "second" are merely used for distinguishing and description, but should not be understood as indicating or implying relative importance, or should not be understood as indicating or implying a sequence.

It should be noted that in embodiments of this application, "connection" refers to an electrical connection, and a connection between two electrical components may be a direct or indirect connection between the two electrical components. For example, a connection between A and B may be a direct connection between A and B, or may be an indirect connection between A and B through one or more other electrical elements. For example, a connection between A and B may alternatively be a direct connection between A and C, a direct connection between C and B, and the connection between A and B is implemented through C.

Nowadays, energy problems are more prominent in the world. As a kind of clean energy, a battery is used more widely in many scenarios, and frequency of use of the battery is also increasing. Therefore, a person skilled in the art has conducted much research on rechargeable high performance batteries. Further, there is an urgent need to develop a fast charging technology to rapidly charge batteries.

A battery charging process may be generally summarized as follows: A current is allowed to flow through the battery, so that charge and energy are accumulated, and charging is finally completed. However, generally, to meet a requirement of fast charging, a relatively large charging current needs to be supplied to the battery. When a charging current for the battery is relatively large and time is relatively long, ion concentration at the electrode increases, and a polarization phenomenon also increases. Therefore, a series of problems such as reaction decomposition of an electrolyte and gas generation of the electrolyte occur. These problems affect battery safety, permanently reduce performance of the battery, and greatly shorten battery life.

A conventional fast charging method includes: a constant current method, where the method is used for charging with a uniform current throughout; a constant voltage method, where the method is used for charging with a uniform voltage throughout and a constant current-constant voltage method, where the method is used for charging with a uniform current at the start of charging and charging with a uniform voltage at the end of charging.

When the constant current method is used at the start of charging, a flowing high current is generated due to a high voltage difference. in terms of fast charging, a higher charging current is better, but continuous charging the battery through a high charging current for a long time can reduce charging efficiency and affect battery life. In the constant voltage method, because a temperature change and heat that is generated by the battery cause a significant change of a battery voltage at the end of charging, it is difficult to preset a constant voltage value for charging. The constant current-constant voltage method is most commonly used. First, the constant current. method is used for charging. When a voltage of the battery reaches a charging cutoff voltage, the constant voltage method is used for charging, and a charging current gradually decreases. When the charging current of the battery decreases to a specific value, charging ends. This charging manner requires too much time and cannot meet a current requirement for a charging speed.

A most difficult problem of charging in a constant current mode is a battery degradation problem that is caused by lithium precipitation (which is also referred to as lithium plating) on a surface of a negative electrode, when the battery is continuously charged through a very large charging current for a long time. Lithium precipitation means that generally, in a charging process of a lithium-ion battery, lithium ions in the lithium-ion battery are embedded in a negative electrode from a positive electrode. However, when some abnormal conditions occur, lithium ions that are removed from the positive electrode cannot be embedded in the negative electrode, and the lithium ions can only precipitate on a surface of the negative electrode, to form a layer of gray materials. This phenomenon is referred to as lithium precipitation. Lithium precipitation not only reduces battery performance and greatly shortens cycle life, but also limits a rapid charging capacity of the battery, and may cause consequences such as combustion and explosion.

To prevent occurrence of a lithium precipitation phenomenon, a charging apparatus prevents a negative electrode potential of the battery from being reduced to 0 V or less, by reducing/increasing a charging current in a step manner and controlling a charging rate, so as to increase a charging speed while the lithium precipitation phenomenon does not occur on the surface of the negative electrode of the battery. Reducing/increasing the charging current in a step manner may be specifically divided into a charging manner such as a three-step manner or a five-step manner. These charging manners are relatively simple. The charging apparatus charges the battery with a constant current at a set SOC value and a specified temperature, and then, at a next critical point, the charging apparatus performs stepwise sudden change on the charging current that is supplied to the battery.

However, due to a current change in a step manner (that is, a transient jump of the current), a charging power is also enabled to jump. In addition, due to the polarization phenomenon of the battery (when a current flows through the battery, a phenomenon in which a potential is enabled to deviate from an equilibrium potential is referred to as battery polarization), a charging current generates a step change and also causes a voltage jump easily. Therefore, a power and/or voltage jump causes a battery management system (BMS) to frequently trigger a fault protection mechanism of the battery. In addition, the power jump generated instantly also causes a loss of a circuit component in an entire charging system. Therefore, reliability of the charging system is severely affected.

In view of this, this application provides a charging apparatus 100. As shown in FIG. 1, the charging apparatus 100 includes a step-current adjustment circuit 10 and an inertial link circuit 20. An input end of the step-current adjustment circuit 10 is connected to a direct current input source 30, an output end of the step-current adjustment circuit 10 is connected to an input end of the inertial link circuit 20, and an output end of the inertial link circuit 20 is connected to a battery 40.

The step-current adjustment circuit 10 in this embodiment of this application is configured to: determine a first current value based on a present charging current condition, and input a current of the first current value to the inertial link circuit 20. The charging current condition includes a temperature of the battery 40 and a state of charge (SOC) of the battery 40. The state of charge refers to a ratio of a remaining capacity of the battery after a period of use or long period of not in use to a capacity in a fully charged state. When the charging current condition changes, the second current value is determined based on a present charging current condition, and a current of the second current value is input to the inertial link circuit 20.

When a received charging current is the first current value, the inertial link circuit 20 outputs the current of the first current value to the battery 40. When the received charging current is converted from the first current value to the second current value, the inertial link circuit 20 smoothly adjusts the charging current from the first current value to the second current value, and continuously outputs the smoothly adjusted current to the battery 40 in a smooth adjustment. process. After the charging current is smoothly adjusted from the first current value to the second current value, the inertial link circuit 20 outputs the current of the second current value to the battery 40.

The battery 40 in this embodiment of this application may be a lithium-ion battery cell, or may be a lithium-ion battery module. The battery module may include one or more lithium-ion battery cells. An external form of the lithium-ion battery cell includes but is not limited to a soft pack, a cylindrical, a square, or a special-shaped lithium-ion battery. The battery 40 in this embodiment of this application may alternatively be a battery system, where the battery system may include at least one lithium-ion battery cell or at least one battery module. It may be understood that the battery in this embodiment of this application may not be limited to a lithium-ion battery, or may be lead-acid battery, a sodium battery, a magnesium battery, an aluminum battery, a potassium battery, or the like. The charging apparatus 100 provided in this application may charge a battery cell, or charge an entire battery module, or charge a charging system.

To avoid the polarization phenomenon of the battery, a current that is supplied by the step-current adjustment circuit 10 to the inertial link circuit 20 is limited by a charging current condition. The charging current condition may be a temperature of the battery 40 and a state of charge SOC of the battery 40, but is not limited thereto. The SOC may be used to represent a state of a remaining capacity of the battery, and a value of the SOC is a ratio of the remaining capacity of the battery to a current maximum available capacity of the battery. Generally, when the value of the SOC is 100%, it indicates that the battery is in a fully charged state. When the value of the SOC is 0%, it indicates that the battery is in a fully discharged state. For different SOCs of the battery 40, magnitudes of charging currents supplied to the battery 40 are also different.

Optionally, the temperature of the battery 40 in this embodiment of this application may be an internal cell temperature of the battery 40, or may be an external ambient temperature of the battery 40. In addition, the current that is supplied by the step-current adjustment circuit 10 to the inertial link circuit 20 may also be related to an open circuit voltage of the battery 40, a battery polarization voltage of the battery 40, a battery polarization rate coefficient of the battery 40, and the like. Specific related parameters are known by a person skilled in the art, and details are not described herein.

When a received charging current is the first current value, the current of the first current value is output to the battery 40. When the received charging current is converted from the first current value to the second current value, the charging current is smoothly adjusted from the. first current value to the second current value, and the smoothly adjusted current is continuously output to the battery 40 in a smooth adjustment process. After the charging current is smoothly adjusted from the first current value to the second current value, the current of the second current value is output to the battery 40.

Figure 2:
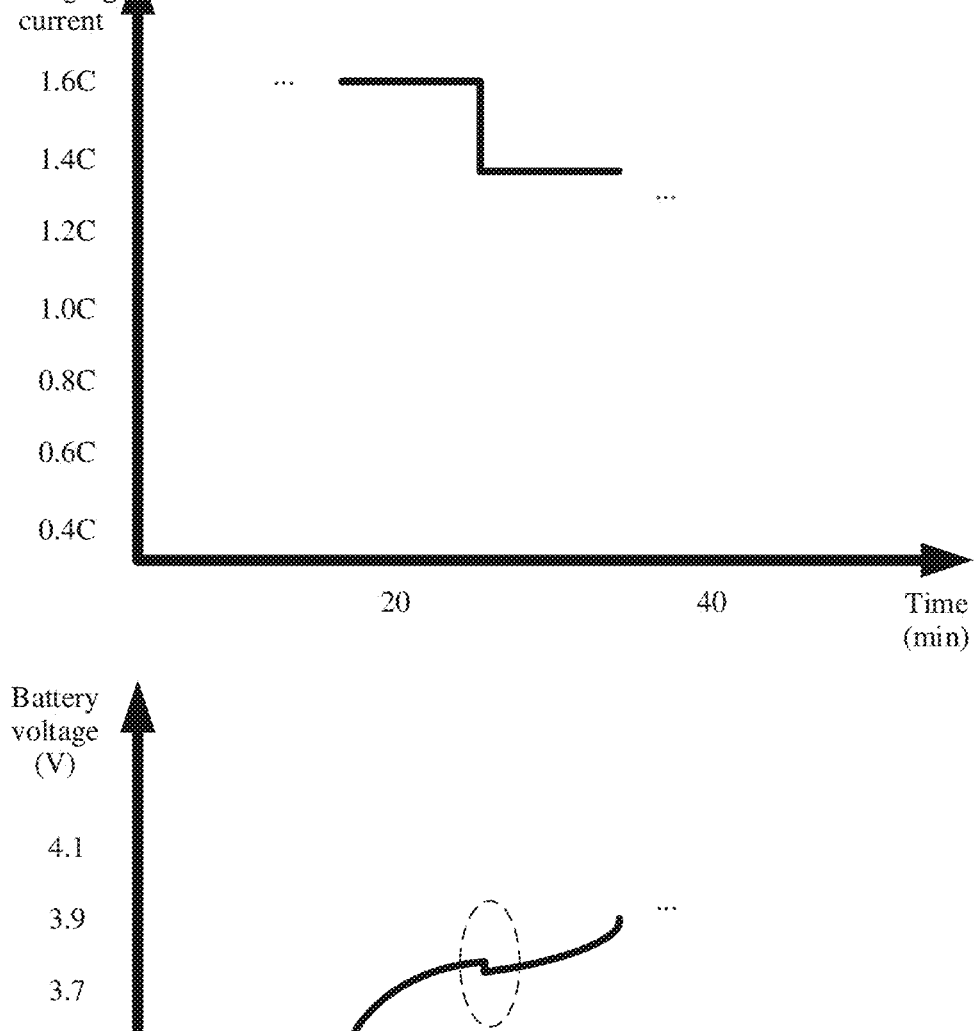
FIG. 2 is a schematic diagram of current and voltage changes during step charging.

For example, referring to FIG. 2, when the SOC of the battery 40 is from 5% to 30% and a temperature of the battery 40 is 25° C., the step-current adjustment circuit 10 determines that the first current value is 1.6 C, and when the SOC of the battery 40 is from 30% to 50% and the temperature of the battery 40 is 25° C., the step-current adjustment circuit 10 determines that the second current value is 1.4 C. It may be seen from FIG. 2 that, when a present step-current changes, and the current is adjusted due to the change of the temperature of the battery 40 and the change of the state of charge SOC of the battery 40, and the current undergoes a step change (a current value changes from 1.6 C to 1.4 C), resulting in a voltage overshoot phenomenon of the battery, and the voltage overshoot phenomenon enables a current voltage of the battery 40 to be higher than a cutoff voltage of the battery 40. Therefore, a fault protection mechanism is triggered, where the cutoff voltage may be a fixed voltage value set by a manufacturer when the battery 40 is delivered from a factory, or may be calculated and set by a person skilled in the art to extend battery life. The cutoff voltage is also referred to as an end voltage, which means that when a battery discharges, a voltage falls to a lowest operating voltage value that is not suitable for the battery to continue discharging. Different battery types and different discharge conditions correspond to different cutoff voltages.

It should be noted that the foregoing C refers to a battery charging and discharging rate. 1 C means current intensity when the battery is fully charged within 1 hour. If charging is finished within 1 hour, the charging current during charging is 1 C. if charging is finished within 5 hours, the charging current during charging is $\frac{1}{5}$=0.2 C.

In this embodiment of this application, if the charging current that is received by the inertial link circuit 20 is converted from the first current value to the second current value, the charging current may be smoothly adjusted from the first current value to the second current value, and the smoothly adjusted current is continuously output to the battery in a smooth adjustment process. A corresponding smooth adjustment curve during smooth adjustment and a time for smoothly adjusting and changing from the first current value to the second current value are not. specifically limited.

In a possible implementation, in a process in which the inertial link circuit 20 smoothly adjusts the charging current from the first current value to the second current value, an output current value that is output by the inertial link circuit 20 to the battery 40 gradually changes from the first current value to the second current value. The current value that is output by the inertial link circuit 20 is between the first current value and the second current value.

If the first current value is less than the second current value, the output current value of the inertial link circuit 20 gradually increases from the first current value to the second current value. If the first current value is not less than the second current value, the output current value of the inertial link circuit 20 gradually decreases from the first current value to the second current value. In addition, the process of changing from the first current value to the second current value may be a process of a linear change (a magnitude of a current conversion rate is fixed), or may be a process of a non-linear change (a magnitude of a current conversion rate is not fixed).

In a possible implementation, a change of the output current value that is output by the inertial link circuit 20 to the battery is related to the first current value, the second current value, and a set time constant.

Specifically, the set time constant in this embodiment of this application is also referred to as $\tau$. The geometric meaning of $\tau$ is equal to the opposite number of the reciprocal of an initial attenuation rate in response to the transfer function. The physical meaning of the set time constant is equal to a required time for the response to decrease along the initial attenuation rate to 0, and may also be equal to an elapsed time for the transfer function decreasing to 36.8% of an initial value. $\tau$ reflects a rate of charging and discharging of a dynamic element in the circuit, that is, a speed of the dynamic element undergoing a transient process change. A larger $\tau$ value indicates a longer charging and discharging time of the dynamic element in the circuit, and a longer time of the dynamic element undergoing the transient process. In a first-order circuit, a constraint relationship between a voltage and a current of a capacitor element and an inductor element is expressed through a derivative or an integral. Therefore, the capacitor element and the inductor element are referred to as dynamic elements.

A person skilled in the art may flexibly set a magnitude of the set time constant based on a specific scenario. For example, in a charging scenario for a power battery, because the power battery is sensitive to a change of a magnitude of a charging current, the set time constant $\tau$ may be set to is or even lower. In a charging scenario of an energy storage battery, because the energy storage battery is not sensitive to a change of a magnitude of a current, the set time constant $\tau$ may be set to 3 s. In other words, a larger set time constant indicates a faster speed at which the inertial link circuit 20 gradually changes from the first current value to the second current value, and a smaller time constant indicates a slower speed at which the output charging current value gradually changes from the first current value to the second current value. In addition, in a process in which the inertial link circuit 20 smoothly adjusts the charging current from the first current value to the second current value, a current value curve change shape that is presented by the current value output by the inertial link circuit 20 is the same as a change of a transfer function.

Specifically, the inertial link circuit 20 may include a first-order circuit, where the first-order circuit may be a resistor-inductor RL circuit or a resistor-capacitor RC circuit. According to a dynamic element in the first-order circuit, when the current that is output by the step-current adjustment circuit 10 changes from the first current value to the second current value, a step transient change is converted into a smooth change. A rate of a smooth change of the step-current adjustment circuit 10 is related to a parameter of the dynamic element in the first-order circuit. Different set time constants may be obtained by configuring different parameters of the dynamic element.

In a possible implementation, the inertial link circuit is specifically configured to gradually change, based on a transfer function, an output current value that is output to the battery from the first current value to the second current value. When the first current value is less than the second current value, the transfer function is:

$$y(t) = k_1 + (k_2 - k_1) * e^{-\frac{t}{\tau}}.$$

Figure 3A:
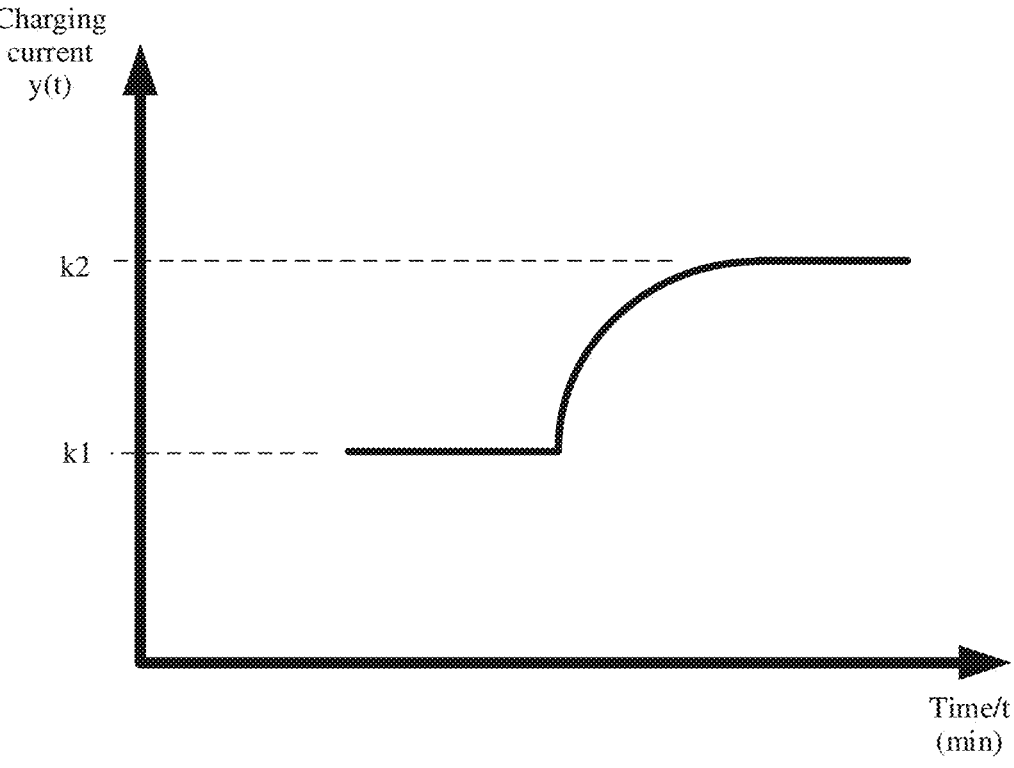
FIG. 3A is a schematic diagram 1 of a current curve that is processed by an inertial link circuit.

FIG. 3A is a schematic diagram 1 of a current curve that is processed by an inertial link circuit 20. When a current that is output by the step-current adjustment circuit 10 changes from a first current value k1 to a second current value k2, through the inertial link circuit 20, a transient change may be converted into a smooth change, so that a charging current that is output by the inertial link circuit 20 gradually increases from the first current value k1 to the second current value k2.

When the first current value is not less than the second current value, the transfer function is:

$$y(t) = k_1 - (k_1 - k_2) * \left(1 - e^{-\frac{t}{\tau}}\right),$$

Figures 3B, 4:
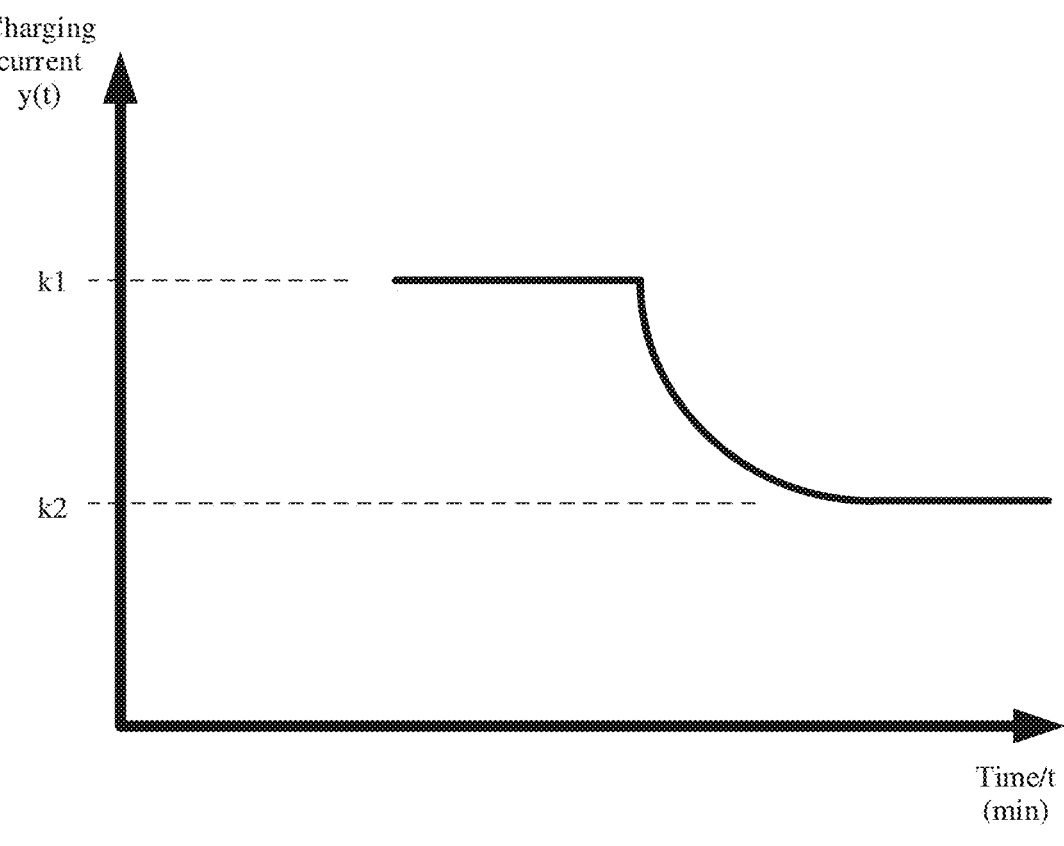
FIG. 3B is a schematic diagram 2 of a current curve that is processed by an inertial link circuit.
FIG. 4 is a schematic diagram of a structure of a current smoothing module.

FIG. 3B is a schematic diagram 2 of a current curve that is processed by an inertial link circuit 20. When a current that is output by the step-current adjustment circuit 10 changes from a first current value k1 to a second current value k2, through the inertial link circuit 20, a transient change may be converted into a smooth change, so that a charging current that is output by the inertial link circuit 20 gradually decreases from the first current value k1 to the second current value k2.

In the foregoing embodiment, is an output current value that is output to the battery by the inertial link circuit 20. $k_1$ is the first current value, $k_2$ is the second current value, $\tau$ is the set. time constant, and t is a time elapsed after the charging current that is received by the inertial link circuit is converted from the first current value to the second current. value.

In a possible implementation, referring to FIG. 4, the inertial link circuit 20 in FIG. 4 includes a target resistor 21 and a target inductor 22, where the target resistor 21 is connected to the target inductor 22 in series. The target resistor 21 and the target inductor 22 constitute a resistor-inductor RL circuit (that is, a first-order circuit). In the RL circuit, a larger inductance value indicates more energy stored in the inductor, and indicates a longer charging time; and a smaller resistance indicates a smaller power consumed by the resistor, and similarly indicates a longer charging time. Therefore, in a possible implementation, the inertial link circuit 20 is specifically configured to determine a resistance value of the target resistor 21 and an inductance value of the target inductor 22 based on the set time constant. The target resistor 21 and the target inductor 22 constitute the resistor-inductor RL circuit, and the set time constant is equal to a ratio of the target resistor 21 to the target inductor 22. Therefore, the resistance value of the target resistor and the inductance value of the target inductor may be determined based on a predetermined set time constant.

Optionally, when the target resistor 21 has a fixed resistance value, the inertial link circuit 20 may determine the inductance value of the target inductor 22 based on a product of the set dine constant and the resistance value of the target resistor. When the target inductor 22 has a fixed inductance value, the inertial link circuit 20 may determine the resistance value of the target resistor 21, based on a ratio of the fixed inductance value to the set time constant. For example, the inertial link circuit 20 may first determine a resistance value range of the target resistor 21, select an optimal resistance value (that is, a fixed resistance value) from the determined resistance value range of the target resistor 21 based on resistance loss and cost considerations, and determine the inductance value of the target inductor 22 based on the resistance value and a magnitude of the set time constant.

In a possible implementation, the charging apparatus 100 further includes a temperature and state of charge monitoring module 50. The temperature and state of charge monitoring module 50 is configured to: detect a temperature and a state of charge of the battery 40, and determine a present charging current condition.

The temperature and state of charge monitoring module 50 may include a voltage detection circuit, a current detection circuit, and a temperature detection circuit. The voltage detection circuit may be connected to the battery 40, and is configured to detect a voltage of the battery 40. The current detection circuit is connected to the battery 40, and is configured to detect a current of the battery 40. The temperature detection circuit may be connected to the battery 40, and is configured to detect a temperature of the battery 40. The temperature and state of charge monitoring module 50 determines an SOC of the battery 40 through a voltage and a current of the battery 40 that are collected in real time by the voltage detection circuit and the current detection circuit, or through a voltage and a current of the battery 40 that are collected at a fixed time point or at an interval. Similarly, the temperature detection circuit in the temperature and state of charge monitoring module 50 is configured to collect the temperature of the battery 40 in real time, or collect, at a fixed time point or at an interval, the temperature of the battery 40 that is collected in real time, or collect the temperature of the battery 40 at a fixed time point or at an interval.

Optionally, the step-current determining module 10 may further include a control module. The control module may be a processor or a controller, such as a general-purpose central processing unit (CPU), a general-purpose processor, a digital signal processing (DSP), an application specific integrated circuit (ASIC), a field programmable gate array (FPGA), or another programmable logic device, a transistor logic device, a hardware component, or any combination thereof. The processor or controller may implement or execute logical blocks, modules, and circuits in various examples described with reference to content disclosed in this application. Alternatively, the processor may be a combination of processors implementing a computing function, for example, a combination of one or more microprocessors, or a combination of a DSP and a microprocessor. The control module in the step-current determining module 10 is configured to control a charging process of the battery 40. Correspondingly, the step-current determining module 10 may further include, a voltage and current adjustment module, where the voltage and current adjustment module may include a voltage regulating circuit, a current regulating circuit, and the like. The control module adjusts or changes, based on the temperature of the battery 40 and the state of charge SOC of the battery 40, a voltage or a current of electric energy that is input to the battery 40.

In a possible implementation, the charging apparatus 100 further includes a step-current relationship establishment module. The step-current relationship establishment module is configured to establish at least one correspondence between a charging current condition and a current value, where a current value in any correspondence between a charging current condition and a current value is a charging current value in a constant current charging stage. The step-current adjustment circuit 10 is specifically configured to: determine, based on the at least one correspondence between a charging current condition and a current value, a first current value corresponding to a present charging current condition, and adjust a current that is input by the direct current input source to a current of the first current value; and when the charging current condition changes, determine, based on the at least one correspondence between a charging current condition and a current value, a second current value corresponding to a present charging current condition, and adjust a current that is input by the direct current input source to a current of the second current value.

Usually, different temperatures of the battery 40 or different SOCs of the battery lead to different performance of the battery. Therefore, when the temperatures of the battery 40 or the SOCs of the battery are different, charging efficiency of the battery 40 is different. To ensure charging efficiency of the battery 40, the step-current adjustment circuit 10 may establish a correspondence between the charging current condition and a current value based on the temperature of the battery 40. The step-current adjustment circuit 10 is configured to charge the battery 40 through parameters in the correspondence, such as a charging current and a charging voltage. The control module in the step-current adjustment circuit 10 may include a memory, where the memory may store a correspondence between a charging current condition and a current value.

In the memory in the control module, the correspondence between a charging current condition and a current value may be stored in a form of a data table. For example, in a correspondence between a temperature and a charging current, each temperature corresponds to a different charging current. In another example, a correspondence between a temperature and a charging current includes a plurality of temperature sets, and each temperature set separately corresponds to a different charging current. One temperature set may include at least one temperature value. Temperatures in each temperature set are different. The control module may search, from the correspondence between a charging current condition and a current value, for a charging current corresponding to the collected temperature. For example, the control module may search, based on a latest obtained temperature of the battery 40 to be charged, for a charging current corresponding to the latest obtained temperature of the battery 40 to be charged from the correspondence between a charging current condition and a current value.

One constant current charging stage may correspond to one SOC interval range, and SOCs in any two SOC intervals are different. In two adjacent constant current charging stages in a plurality of constant current charging stages, values in an SOC interval corresponding to the former constant current charging stage are all less than those in an SOC interval corresponding to the latter constant current charging stage. In other words, a sequence of each constant current charging stage may be determined in ascending order based on a minimum value of an SOC interval corresponding to each constant current charging stage.

The memory in the control module may store a correspondence between each constant current charging stage and an SOC interval, so that a charging current at the constant current charging stage that is used to charge the battery 40 is selected from a correspondence between each constant current charging stage and an SOC interval. A correspondence between the constant current charging stage sequence and an SOC may be used to determine at least one constant current charging stage that is used when the battery 40 is charged. The correspondence between the constant current charging stage sequence and an SOC may include at least one SOC and a constant current charging stage sequence corresponding to the SOC. The memory may store a correspondence between an SOC and a current in a form of a data table. In an example, in the correspondence between an SOC and a current, each SOC corresponds to a different current. In another example, the correspondence between an SOC and a current may include at least one constant current charging stage of a plurality of constant current charging stages. The control module may search, based on the SOC of the battery 40, for a current corresponding to the SOC of the current battery 40 from the correspondence between an SOC and a current. In addition, the memory of the control module may further store another current or voltage value at a non-constant current charging stage. This should be known by a person skilled in the art, Details are not described herein.

Specifically, the charging apparatus 100 may charge the battery 40 based on currents at some of the plurality of constant current charging stages or at all constant current charging stages. When the battery 40 to be charged has a different SOC and temperature, a magnitude of a current at the constant current charging stage that is used to charge the battery 40 by the charging apparatus 100 may be not exactly same. Before charging the battery 40, the control module may detect the SOC of the battery 40 and the temperature of the battery 40 in advance, and select a current value of at least one constant current charging stage from currents at the plurality of constant current charging stages. A charging current at the at least one constant current charging stage may include a charging current at a constant current charging stage corresponding to an SOC interval in which the SOC of the battery 40 is located, and a charging current at a constant current charging stage corresponding to a state of charge interval greater than that of the state of charge in the SOC interval.

The charging apparatus provided in this application may resolve a disadvantage of step charging, and eliminate problems of the power jump and the voltage overshoot, so that problems of a loss to a component and frequent false triggering of a fault protection policy that are caused by the power jump and the voltage overshoot can be avoided. In addition, the magnitude of the set time constant may be changed based on an actual need. Therefore, a current smooth transition rate of step charging may also be changed based on an actual need. In addition, when step charging is performed on the battery, a charging end polarization phenomenon of the battery also changes based on a transfer function. Therefore, reverse compensation may be performed by a current smoothing module in this application, to implement a depolarization change of the battery, so as to extend a battery life.

Based on the foregoing embodiment, an embodiment of this application provides a charging method, where the method is applied to a scenario of constant current charging. The method includes: adjusting a current that is input by a direct current input source to a current of a first current value based on a present charging current condition, where the charging current condition includes a temperature of a battery and a state of charge SOC of the battery; when the charging current condition changes, adjusting a current that is input by the direct current input source to a current of a second current value based on a present charging current condition; when a charging current is the first current value, outputting the current of the first current value; when the charging current is converted from the first current value to the second current value, smoothly adjusting the charging current from the first current value to the second current value, and continuously outputting a smoothly adjusted current in a smooth adjustment process; and after the charging current is smoothly adjusted from the first current value to the second current value, outputting the current of the second current value.

In a possible implementation, in a process in which the charging current is smoothly adjusted from the first current value to the second current value, an output current value that is output to the battery gradually changes from the first current value to the second current value.

In a possible implementation, a change of the output current value that is output to the battery is related to the first current value, the second current value, and a set time constant.

In a possible implementation, the smoothly adjusting the charging current from the first current value to the second current value includes: gradually changing, based on a transfer function, the output current value that is output to the battery from the first current value to the second current value. When the first current value is less than the second current value, the transfer function is:

$$y(t) = k_1 + (k_2 - k_1) * e^{-\frac{t}{\tau}}.$$

When the first current value is not less than the second current value, the transfer function is:

$$y(t) = k_1 - (k_1 - k_2) * \left(1 - e^{-\frac{t}{\tau}}\right),$$

where y(t) is the output value that is output to the battery, $k_1$ is the first current value, $k_2$ is the second current value, $\tau$ is the set time constant, and t is a time elapsed after the charging current that is received by the inertial link circuit is converted from the first current value to the second current value.

In a possible implementation, the method further includes: establishing at least one correspondence between a charging current condition and a current value, where a current value in any correspondence between a charging current condition and a current value is a charging current value in a constant current charging stage. The adjusting a current that is input by a direct current input source to a current of a first current value, and when the charging current condition changes, adjusting the current that is input by the direct current input source to a current of a second current value based on a present charging current condition includes: determining, based on the at least one correspondence between a charging current condition and a current value, a first current value corresponding to the present charging current condition, and adjusting the current that is input by the direct current input source to the current of the first current value; and when the charging current condition changes, determining, based on the at least one correspondence between a charging current condition and a current value, a second current value corresponding to a present charging current condition, and adjusting the current that is input by the direct current input source to the current of the second current value.

In a possible implementation, the method further includes:

detecting a temperature of the battery and a state of charge of the battery, and determining the present charging current condition.

In the foregoing embodiment, all or some of the foregoing methods may be. implemented by using software, hardware, firmware, or any combination thereof. When software is used to implement the methods, all or a part of the methods may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. An available medium may be a magnetic medium (for example, a floppy disk, a hard disk, or a magnetic tape), or a semiconductor medium (for example, a solid state disk (SSD)).

An embodiment of this application further provides a computer-readable storage medium, configured to store the method or the algorithm provided in the foregoing embodiment. For example, a random access memory (RAM), a flash memory, a read only memory (ROM), an EPROM memory, an electronic programmable ROM (EPROM), a register, a hard disk, a removable disk, or any other form of storage medium in the art.

Each step of the described method in embodiments of this application may be directly embedded in a charging apparatus. The charging apparatus may include the RAM memory, the flash memory, the ROM memory, the EPROM memory, the register, the hard disk, the removable disk, or the any other form of storage medium in the art, and is configured to store the charging method provided in this embodiment of this application. For example, the storage medium may be connected to a control module or a processor (or a controller) in the charging apparatus, so that the control module or the processor (or the controller) may read information from the storage medium, and may store and write information to the storage medium. Optionally, the storage medium may be further integrated into the control module and the processor (or the controller).

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Based on the foregoing embodiment, this application further provides a charging station. The charging station includes the charging apparatus provided in the foregoing embodiment, and the charging station is configured to supply electric energy to a device to be charged.

In addition, this application further provides a charging system. The charging system includes a direct current input source, a device to be charged, and the charging station in the foregoing embodiment. An input end of a charging apparatus is connected to the direct current input source, an output end of the charging apparatus is connected to the device to be charged, and the charging apparatus is configured to supply electric energy of the direct current input source to a battery in the device to be charged.

Although this application is described with reference to specific features and all the embodiments thereof, it is clear that various modifications and combinations may be made to them without departing from the scope of this application. Correspondingly, this specification and the accompanying drawings are merely example description of this application defined by the appended claims, and are considered as any or all of modifications, variations, combinations or equivalents that cover the scope of this application.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A charging apparatus, comprising:
a step-current adjustment circuit; and
an inertial link circuit;
wherein an input end of the step-current adjustment circuit is connected to a direct current input source, wherein an output end of the step-current adjustment circuit is connected to an input end of the inertial link circuit, and wherein an output end of the inertial link circuit is connected to a battery;
wherein the step-current adjustment circuit is configured to:
adjust a current to a current of a first current value based on a present charging current condition, wherein the current is provided by the direct current input source; and
provide the current of the first current value to the inertial link circuit, wherein the present charging current condition comprises a temperature of the battery and a state of charge (SOC) of the battery; and
adjust, in response to the present charging current condition changing, the current that is provided by the direct current input source to a current of a second current value based on a changed charging current condition, and provide the current of the second current value to the inertial link circuit; and
wherein the inertial link circuit is configured to:
output, in response to a received charging current being the first current value, the current of the first current value to the battery;
smoothly adjust the charging current from the first current value to the second current value in response to the received charging current being converted from the first current value to the second current value, and continuously output the smoothly adjusted current to the battery in a smooth adjustment process; and
output the current of the second current value to the battery after the charging current is smoothly adjusted from the first current value to the second current value,
wherein to smoothly adjust is to gradually change the first current value to the second current value in less than a step-wise fashion.

2. The charging apparatus according to claim 1, wherein the inertial link circuit smoothly adjusting the charging current from the first current value to the second current value results in an output current value that is output by the inertial link circuit to the battery gradually changing from the first current value to the second current value.

3. The charging apparatus according to claim 1, wherein a change of an output current value that is output by the inertial link circuit to the battery is related to the first current value, the second current value, and a set time constant.

4. The charging apparatus according to claim 3, wherein the inertial link circuit comprises a target resistor and a target inductor, wherein the target resistor is connected to the target inductor in series, and wherein a resistance value of the target resistor and an inductance value of the target inductor are associated with the set time constant.

5. The charging apparatus according to claim 4, wherein the inertial link circuit is configured to perform at least one of:

determining the inductance value of the target inductor based on a product of the set time constant and a fixed resistance value, wherein the target resistor has the fixed resistance value; or determining the resistance value of the target resistor based on a ratio of a fixed inductance value to the set time constant, wherein the target inductor has the fixed inductance value.

6. The charging apparatus according to claim 1, wherein the inertial link circuit is configured to smoothly adjust the charging current by:

gradually changing, based on a transfer function, an output current value that is output to the battery from the first current value to the second current value, wherein when the first current value is less than the second current value, the transfer function is:

$$y(t) = k_1 + (k_2 - k_1) * e^{-\frac{t}{\tau}};$$

and wherein when the first current value is not less than the second current value, the transfer function is:

$$y(t) = k_1 - (k_1 - k_2) * \left(1 - e^{-\frac{t}{\tau}}\right),$$

wherein y(t) is the output current value that is output by the inertial link circuit to the battery, wherein $k_1$ is the first current value, wherein $k_2$ is the second current value, wherein $\tau$ is a set time constant, and t is a time elapsed after the charging current that is received by the inertial link circuit is converted from the first current value to the second current value.

7. The charging apparatus according to claim 1, wherein the charging apparatus further comprises a step-current relationship establishment module;

wherein the step-current relationship establishment module is further configured to establish at least one correspondence between a charging current condition and a current value, wherein a current value in a correspondence between a charging current condition and a current value is a charging current value in a constant current charging stage; and wherein the step-current adjustment circuit is configured to determine, based on the at least one correspondence between the present charging current condition and a current value, the first current value corresponding to the present charging current condition;

wherein the step-current adjustment circuit being configured to adjust the current to the current of the first current value comprises the step-current adjustment circuit being configured to adjust the current to the current of the first current value determined based on the at least one correspondence;

wherein the step-current relationship establishment module is further configured to determine, in response to the charging current condition changing and based on the at least one correspondence between the present charging current condition and the current value and, the second current value corresponding to the changed charging current condition; and wherein the step-current relationship establishment module being configured to adjust, in response to the charging current condition changing, the current that is provided by the direct current input source to the current of the second current value comprises the step-current relationship establishment module being configured to adjust the current that is input by the direct current input source to a current of the second current value corresponding to a changed charging current condition.

8. The charging apparatus according to claim 1, wherein the charging apparatus further comprises a temperature and state of charge monitoring module; and wherein the temperature and state of charge monitoring module is configured to: detect a temperature of the battery and a state of charge of the battery, and determine a present charging current condition.

9. A charging method, comprising:

adjusting a current to a current of a first current value based on a present charging current condition, wherein the current is provided by a direct current input source, and wherein the present charging current condition comprises a temperature of a battery and a state of charge (SOC) of the battery;

adjusting the current to a current of a second current value in response to the present charging current condition changing and based on a changed charging current condition; and outputting the current of the first current value in response to the current being the first current value;

smoothly adjusting the current from the first current value to the second current value in response to the current being converted from the first current value to the second current value;

continuously outputting a smoothly adjusted current in a smooth adjustment process; and outputting the current of the second current value after the charging current is smoothly adjusted from the first current value to the second current value, wherein to smoothly adjust is to gradually change the first current value to the second current value in less than a step-wise fashion.

10. The method according to claim 9, wherein smoothly adjusting the charging current from the first current value to the second current value results in an output current value that is output to the battery gradually changing from the first current value to the second current value.

11. The method according to claim 9, wherein a change of an output current value that is output to the battery is related to the first current value, the second current value, and a set time constant.

12. The method according to claim 9, wherein smoothly adjusting the charging current from the first current value to the second current value comprises:

gradually changing, based on a transfer function, an output current value that is output to the battery from the first current value to the second current value, wherein when the first current value is less than the second current value, the transfer function is:

$$y(t) = k_1 + (k_2 - k_1) * e^{-\frac{t}{\tau}};$$

and wherein, when the first current value is not less than the second current value, the transfer function is:

$$y(t) = k_1 - (k_1 - k_2) * \left(1 - e^{-\frac{t}{\tau}}\right),$$

wherein y(t) is the output current value that is output to the battery, wherein $k_1$ is the first current value, wherein $k_2$ is the second current value, wherein $\tau$ is a set time constant, and wherein t is a time elapsed after the charging current that is received by an inertial link circuit is converted from the first current value to the second current value.

13. The method according to claim 9, further comprising:
establishing at least one correspondence between a charging current condition and a current value, wherein a current value in any correspondence between a charging current condition and a current value is a charging current value in a constant current charging stage; and
wherein adjusting of the current that is input by the direct current input source to the current of the first current value, comprises:
  determining, based on the at least one correspondence between the charging current condition and the current value, the first current value corresponding to the present charging current condition; and
  adjusting the current that is input by the direct current input source to the current of the first current value corresponding to the present charging current condition; and
wherein adjusting the current to the current of the second current value comprises:
  determining, based on the at least one correspondence between the charging current condition and the current value, the second current value corresponding to a changed charging current condition; and
  adjusting the current that is input by the direct current input source to the current of the second current value.

14. The method according to claim 9, further comprising:
detecting a temperature of the battery and a state of charge of the battery, and determining the present charging current condition.

15. A charging station, comprising:
a charging apparatus, configured to supply electric energy to a device to be charged, the charging apparatus comprising:
  a step-current adjustment circuit; and
  an inertial link circuit;
wherein an input end of the step-current adjustment circuit is connected to a direct current input source, wherein an output end of the step-current adjustment circuit is connected to an input end of the inertial link circuit, and wherein an output end of the inertial link circuit is connected to a battery;
wherein the step-current adjustment circuit is configured to:
  adjust a current that is input by the direct current input source to a current of a first current value based on a present charging current condition, wherein the current is provided by the direct current input source;
  provide the current of the first current value to the inertial link circuit, wherein the present charging current condition comprises a temperature of the battery and a state of charge (SOC) of the battery;
adjust, in response to the present charging current condition changing, the current to a current of a second current value based on a changed charging current condition and
  provide the current of the second current value to the inertial link circuit; and
wherein the inertial link circuit is configured to:
  output the current of the first current value to the battery in response to a received charging current being the first current value;
  smoothly adjust the charging current from the first current value to the second current value in response to the received charging current being converted from the first current value to the second current value;
  continuously output a smoothly adjusted current to the battery in a smooth adjustment process; and
  output the current of the second current value to the battery after the charging current is smoothly adjusted from the first current value to the second current value,
  wherein to smoothly adjust is to gradually change the first current value to the second current value in less than a step-wise fashion.

*   *   *   *   *